(12) United States Patent
Bassi et al.

(10) Patent No.: US 11,827,807 B2
(45) Date of Patent: Nov. 28, 2023

(54) METAL SURFACE COATINGS FOR IMPROVING BOND PERFORMANCE AND METHODS OF MAKING THE SAME

(71) Applicants: Novelis Inc., Atlanta, GA (US); EMPA, Swiss Federal Laboratories for Materials Science and Technology, Dübendorf (CH)

(72) Inventors: Corrado Bassi, Salgesch (CH); Michéle Edith Berner, Sion (CH); Sabyasachi Gaan, Gossau (CH); Patrik Schmutz, Zürich (CH)

(73) Assignee: Novelis Inc., Atlanta, GA (US)

( * ) Notice: Subject to any disclaimer, the term of this patent is extended or adjusted under 35 U.S.C. 154(b) by 79 days.

(21) Appl. No.: 17/753,538

(22) PCT Filed: Jul. 7, 2020

(86) PCT No.: PCT/US2020/041042
§ 371 (c)(1),
(2) Date: Mar. 7, 2022

(87) PCT Pub. No.: WO2021/055076
PCT Pub. Date: Mar. 25, 2021

(65) Prior Publication Data
US 2022/0340763 A1    Oct. 27, 2022

Related U.S. Application Data

(60) Provisional application No. 62/901,966, filed on Sep. 18, 2019.

(51) Int. Cl.
| | | |
|---|---|---|
| *C09D 5/08* | (2006.01) | |
| *C07F 9/38* | (2006.01) | |
| *C08K 5/5419* | (2006.01) | |
| *C08K 5/544* | (2006.01) | |
| *C23C 22/56* | (2006.01) | |

(52) U.S. Cl.
CPC ............ *C09D 5/086* (2013.01); *C07F 9/3821* (2013.01); *C09D 5/08* (2013.01); *C08K 5/544* (2013.01); *C08K 5/5419* (2013.01); *C23C 22/56* (2013.01); *C23C 2222/20* (2013.01)

(58) Field of Classification Search
CPC ... C07F 9/3821; C23C 2222/20; C23C 22/03; C09D 5/086
See application file for complete search history.

(56) References Cited

U.S. PATENT DOCUMENTS

| | | | | |
|---|---|---|---|---|
| 3,716,569 | A | * | 2/1973 | Redmore et al. ... C23F 11/1676 556/424 |
| 4,939,068 | A | * | 7/1990 | Lauke .................... C25D 11/06 205/229 |
| 2006/0151070 | A1 | | 7/2006 | Rodzewich et al. |
| 2020/0102526 | A1 | * | 4/2020 | Malmberg ............... C23G 1/19 |

FOREIGN PATENT DOCUMENTS

| | | | |
|---|---|---|---|
| CN | 1103651 | A | 6/1995 |
| CN | 1753945 | A | 3/2006 |
| CN | 101663341 | A | 3/2010 |
| CN | 101792470 | A * | 8/2010 |
| CN | 101848913 | A | 9/2010 |
| CN | 102282223 | A | 12/2011 |
| CN | 103031056 | A | 4/2013 |
| CN | 107709475 | A | 2/2018 |
| CN | 109312469 | A | 2/2019 |
| EP | 1852523 | | 11/2007 |
| FR | 3074186 | | 5/2019 |
| JP | 0671805 | A | 3/1994 |
| JP | 2001014648 | A | 1/2001 |
| JP | 2007514007 | A | 5/2007 |
| JP | 2008088260 | A | 4/2008 |
| WO | 2013182328 | | 12/2013 |
| WO | 2015138127 | A1 | 9/2015 |

OTHER PUBLICATIONS

Machine translation of CN 101792470 (no date).*
Canadian Application No. 3,146,449, "Office Action", dated Feb. 22, 2023, 5 pages.
Chinese Application No. 202080065181.X, "Office Action", dated Mar. 24, 2023, 16 pages.
European Application No. 20750895.3, "Intention to Grant", dated Apr. 3, 2023, 8 pages.
Japanese Application No. 2022-516696, "Office Action", dated Jan. 31, 2023, 9 pages.
International Application No. PCT/US2020/041042, International Search Report and Written Opinion, dated Nov. 6, 2020, 11 pages
Chinese Application No. 202080065181.X, "Office Action", dated Jun. 20, 2022, 22 pages.
European Application No. 20750895.3, "Intention to Grant", dated Dec. 1, 2022, 5 pages.
Japanese Application No. 2022-516696, "Notice of Decision to Grant", dated Aug. 8, 2023, 5 pages.
Chinese Application No. 202080065181.X, "Notice of Decision to Grant", dated Jul. 16, 2023, 6 pages.
Japanese Application No. 2022-516696, "Office Action", dated Jul. 4, 2023, 9 pages.

* cited by examiner (Continued)

*Primary Examiner* — Marc S Zimmer

(74) *Attorney, Agent, or Firm* — Kilpatrick Townsend & Stockton LLP

(57) ABSTRACT

Described herein are compounds for use in coating compositions and methods of using the same. Also described herein is a method of treating metal products (e.g., aluminum alloy products), including applying the coating composition to at least one surface of the metal product. Further described herein is a joined structure, including the coated aluminum alloy product and another metal or alloy. The coating compositions enhance the bond performance of the joined structures.

13 Claims, 1 Drawing Sheet

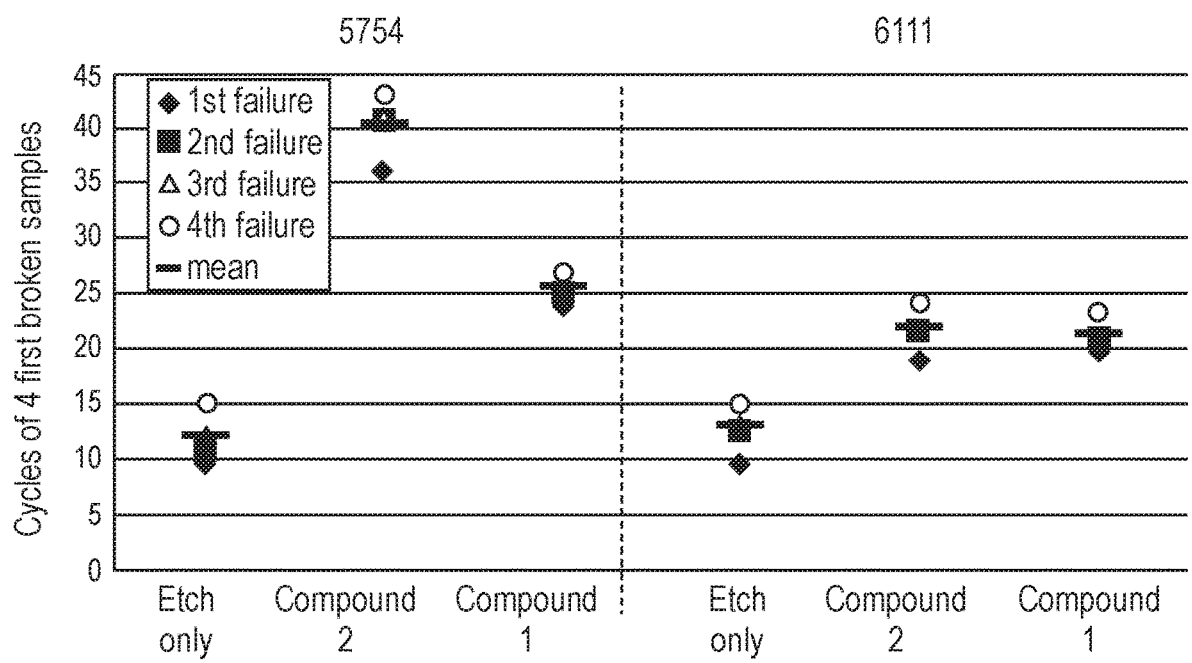

METAL SURFACE COATINGS FOR IMPROVING BOND PERFORMANCE AND METHODS OF MAKING THE SAME

CROSS-REFERENCE TO RELATED APPLICATIONS

The present application claims priority to and filing benefit of U.S. Provisional Patent Application No. 62/901,966, filed on Sep. 18, 2019, which is incorporated herein by reference in its entirety.

FIELD

The present disclosure relates to the field of surface coatings and more specifically to metal surface coatings. The present disclosure also relates to compounds for use in surface coating compositions and methods of using the surface coating compositions.

BACKGROUND

Metals, such as aluminum alloys, are often employed in environments that may cause the metal to corrode. The metals are often joined with (e.g., bonded to) other metals, including similar and dissimilar metals, during motor vehicle, electronics, industrial, and transportation fabrication processes. Joining metals to similar and/or dissimilar metals can induce corrosion (e.g., galvanic corrosion), which can result in bond failure.

SUMMARY

Covered embodiments of the invention are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

Described herein are compounds for use in coating compositions and methods of using the same. A compound as described herein includes a compound of Formula I:

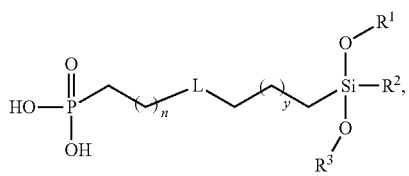

wherein n and y are each independently an integer from 1 to 10; L is —S—, —SO$_2$—, —O—, —NR—, or —N—(CH$_2$)$_p$—OP(OH)$_2$—, wherein R is H or substituted or unsubstituted alkyl and p is from 1 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is H or substituted or unsubstituted alkyl. Optionally, n and y are each 1 and/or L is NH. Optionally, R$^1$ and R$^3$ are each H and R$^2$ is OH. In some examples, the compound is

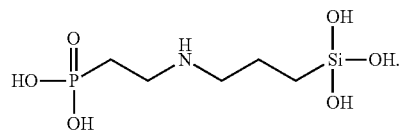 [SMILES: O=P(O)(O)CCNCCC[Si](O)(O)O]

In some cases, a compound as described herein includes a compound of Formula II:

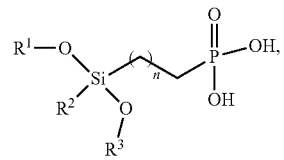

n is an integer from 0 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is selected from H and substituted or unsubstituted alkyl. Optionally in Formula II, when n is 1, R$^1$, R$^2$, and R$^3$ are not simultaneously ethyl.

Also described herein are methods of coating a metal substrate surface. A method of coating a metal substrate surface as described herein comprises applying to a metal substrate surface a composition comprising a compound of Formula I:

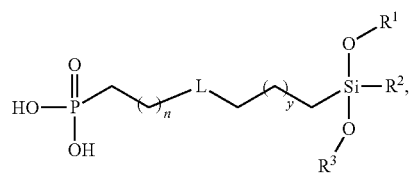

wherein n and y are each independently an integer from 1 to 10; L is —S—, —SO$_2$—, —O—, —NR—, or —N—(CH$_2$)$_p$—OP(OH)$_2$—, wherein R is H or substituted or unsubstituted alkyl and p is from 1 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is H or substituted or unsubstituted alkyl. Optionally, n and y are each 1 and/or L is NH. Optionally, R$^1$ and R$^3$ are each H and R$^2$ is OH. In some examples, the compound is

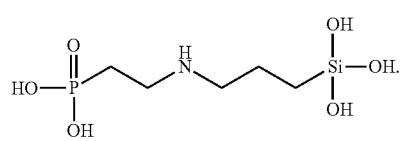 [SMILES: O=P(O)(O)CCNCCC[Si](O)(O)O]

In some cases, a method of coating a metal substrate surface as described herein comprises applying to a metal substrate surface a composition comprising a compound of Formula II:

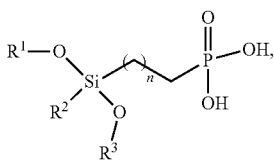

wherein n is an integer from 0 to 10 and $R^1$ and $R^3$ are each independently selected from H and substituted or unsubstituted alkyl; and $R^2$ is selected from $OR^4$, substituted or unsubstituted alkyl, and substituted or unsubstituted phenyl, wherein $R^4$ is selected from H and substituted or unsubstituted alkyl. Optionally, n is 1 and/or $R^2$, and $R^3$ are each substituted or unsubstituted alkyl (e.g., ethyl). In some examples, the compound is

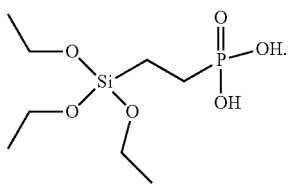 [SMILES: CCO[Si](CCP(=O)(O)O)(OCC)OCC]

The applying can be performed by any suitable method, including by roller coating, spray coating, or dip coating. The method further comprises curing the coating composition to provide a coated metal substrate.

Further described herein are coated metal substrates. A coated metal substrate as described herein comprises a metal substrate comprising at least a first surface and a coating layer adhered to the first surface. In some cases, the coating layer can comprise a compound of Formula I:

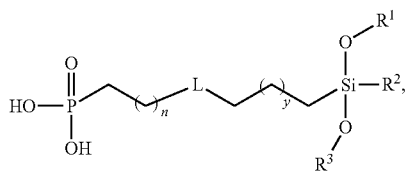

wherein n and y are each independently an integer from 1 to 10; L is —S—, —$SO_2$—, —O—, —NR—, or —N—$(CH_2)_p$—$OP(OH)_2$—, wherein R is H or substituted or unsubstituted alkyl and p is from 1 to 10; $R^1$ and $R^3$ are each independently selected from H and substituted or unsubstituted alkyl; and $R^2$ is selected from $OR^4$, substituted or unsubstituted alkyl, and substituted or unsubstituted phenyl, wherein $R^4$ is H or substituted or unsubstituted alkyl. In some cases, the coating layer can comprise a compound of Formula II:

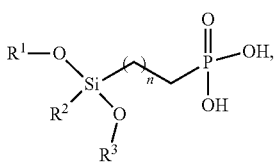

wherein n is an integer from 0 to 10; $R^1$ and $R^3$ are each independently selected from H and substituted or unsubstituted alkyl; and $R^2$ is selected from $OR^4$, substituted or unsubstituted alkyl, and substituted or unsubstituted phenyl, wherein $R^4$ is selected from H and substituted or unsubstituted alkyl.

The metal substrate can comprise an aluminum alloy substrate. For example, the metal substrate can comprise a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

Also described herein are joined metal structures. A joined metal structure can comprise a coated metal substrate as described above and a second metal substrate attached to the coated metal substrate. The second metal substrate can be attached to the first surface of the coated metal substrate (e.g., a surface of the coated metal substrate to which a coating layer is adhered). The joined metal structure can be a transportation structural part, a transportation aesthetic part, an electronics device housing, an architectural structural part, an architectural aesthetic part, a consumer product container (e.g., a can or bottle), a consumer product, or other part.

Other objects and advantages of the invention will be apparent from the following detailed description of non-limiting examples of the invention and FIGURE.

BRIEF DESCRIPTION OF THE FIGURE

FIG. 1 is a graph showing bond durability results of joined structures optionally coated with a coating composition as described herein.

DETAILED DESCRIPTION

Described herein are coating compositions for coating metal substrates. The coating compositions include compounds having at least one phosphorus-containing moiety and at least one silicon-containing moiety. The coating compositions described herein impart improved bond durability to metals joined together with other metals, including with similar or dissimilar metals.

In some non-limiting examples, the coating compositions can modify a surface of a metal. By applying the coating composition to a surface of a metal, the metal surface can be modified such that corrosion resistance is improved and/or the adhesion capabilities of the surface are enhanced. The surface can also be modified to become more hydrophobic or more hydrophilic, based on the metal used as the substrate and the compound used in the coating composition. In some non-limiting examples, a phosphorus-containing moiety (e.g., a functionalized phosphonic acid) can be employed for simultaneous corrosion protection and adhesion enhancement when coated onto, for example, an aluminum alloy. In some cases, the phosphonic acid can react with the aluminum alloy, binding to the surface of the aluminum alloy and thus providing improved corrosion resistance. In some aspects, a coating composition including a compound having a phosphorus-containing moiety can reduce the solubility of the metal in aqueous media and can increase the activation energy for hydrolysis.

Additionally, incorporating a silicon-containing moiety in the compound of the coating composition can provide a silicon oxide network on the metal surface. Such silicon oxide networks formed on a metal (e.g., aluminum alloy) surface can further provide a hydrophobic surface, wherein the metal can be sequestered from water, thus further limiting susceptibility of the metal to corrosion from exposure to moisture. Additionally, hydroxy groups positioned on the silicon oxide network can react with adhesives for improved adhesion performance to organic layers (e.g., epoxies, adhesives, aesthetic coatings, laminate films, any suitable organic surface treatment, or any combination thereof). Employing a phosphorus- and silicon-containing molecule described herein as a coating composition can improve corrosion resistance and bond durability of metals bonded to other metals.

Definitions and Descriptions:

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by AA numbers and other related designations, such as "5xxx" and "series." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

As used herein, a plate generally has a thickness of greater than about 15 mm. For example, a plate may refer to an aluminum alloy product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum alloy product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

Reference may be made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to an aluminum alloy after cold rolling with or without thermal treatment (e.g., annealing). Suitable H tempers include HX1, HX2, HX3 HX4, HX5, HX6, HX7, HX8, or HX9 tempers, along with Hxxx temper variations (e.g., H111), which are used for a particular alloy temper when the degree of temper is close to the Hxx temper. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated, quenched, and artificially aged. A T61 condition or temper refers to an aluminum alloy solution heat treated, quenched, naturally aged for a period of time, and then artificially aged. A T7 condition or temper refers to an aluminum alloy solution heat treated and artificially overaged. A T8x condition or temper (e.g., T8) refers to an aluminum alloy solution heat treated, cold worked, and artificially aged. A T9x condition or temper refers to an aluminum alloy solution heat treated, artificially aged, and cold worked.

As used herein, terms such as "cast metal product," "cast product," "cast aluminum alloy product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

Coating Compositions

Described herein are coating compositions for use in coating metal substrates, such as aluminum alloys. A coating composition as described herein can be applied to a metal substrate to form a coated metal substrate. The coating composition includes a carrier, such as an aqueous-based or solvent-based carrier. The coating composition also includes a coating compound, which can include at least one phosphorus-containing moiety and at least one silicon-containing moiety. The phosphorus-containing moiety (e.g., a phosphonate or phosphonic acid moiety) can react with the metal and improve the corrosion resistance. For example, the phosphorus-containing moiety can react with aluminum. The silicon-containing moiety can form silicone oxide networks on the metal surface (e.g., aluminum surface), which tend to be hydrophobic. Thus, the coating compound can cause the metal surface to become more hydrophobic. In addition, the silicon-containing moiety and/or phosphorus-containing moiety can contain hydroxyl groups that can react with adhesives for improved adhesion performance. Optionally, the coating compounds described herein can also include at least one amine-containing moiety. The amine-containing moiety can improve bonding performance to adhesives, such as to epoxy-based adhesives.

A class of coating compounds described herein is represented by Formula I:

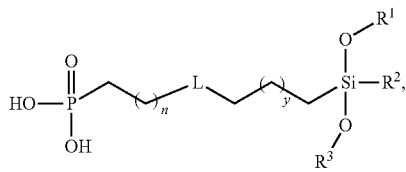

In Formula I, n and y are each independently an integer from 1 to 10. For example, n and/or y can be 1, 2, 3, 4, 5, 6, 7, 8, 9, or 10. In some examples, n and y are each 1.

Also in Formula I, L is —S—, —$SO_2$—, —O—, —NR—, or —N—$(CH_2)_p$—$OP(OH)_2$—, wherein R is H or substituted or unsubstituted alkyl and p is from 1 to 10. In some examples, L is —NH.

Additionally in Formula I, $R^1$ and $R^3$ are each independently selected from H and substituted or unsubstituted alkyl. For example, $R^1$ and/or $R^3$ can be H, methyl, ethyl, propyl, butyl, pentyl, hexyl, heptyl, octyl, nonyl, decyl, isopropyl, isobutyl, sec-butyl, tert-butyl, or neopentyl. In some examples, $R^1$ and $R^3$ are each H.

Further in Formula I, $R^2$ is selected from $OR^4$, substituted or unsubstituted alkyl, and substituted or unsubstituted phenyl, wherein $R^4$ is H or substituted or unsubstituted alkyl. For example, $R^2$ can be methyl, ethyl, propyl, butyl, pentyl, hexyl, heptyl, octyl, nonyl, decyl, isopropyl, isobutyl, sec-butyl, tert-butyl, neopentyl, phenyl, benzyl, or benzoyl.

An example of Formula I includes the following compound:

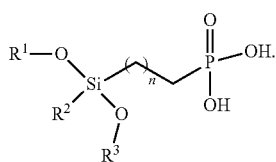

Compound 1

A class of coating compounds described herein is represented by Formula II:

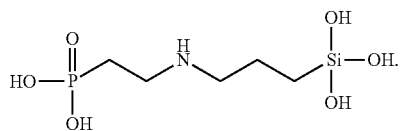 [SMILES: O=P(O)(O)CCNCCC[Si](O)(O)O]

In Formula II, n is an integer from 0 to 10. For example, n can be 0, 1, 2, 3, 4, 5, 6, 7, 8, 9, or 10. In some examples, n is 1.

Also in Formula II, $R^1$ and $R^3$ are each independently selected from H and substituted or unsubstituted alkyl. For example, $R^1$ and/or $R^3$ can be H, methyl, ethyl, propyl, butyl, pentyl, hexyl, heptyl, octyl, nonyl, decyl, isopropyl, isobutyl, sec-butyl, tert-butyl, or neopentyl. Optionally, $R^1$ and $R^3$ are each ethyl.

Further in Formula II, $R^2$ is selected from $OR^4$, substituted or unsubstituted alkyl, and substituted or unsubstituted phenyl, wherein $R^4$ is H or substituted or unsubstituted alkyl. For example, $R^2$ can be methyl, ethyl, propyl, butyl, pentyl, hexyl, heptyl, octyl, nonyl, decyl, isopropyl, isobutyl, sec-butyl, tert-butyl, neopentyl, phenyl, benzyl, or benzoyl.

An example of Formula II includes the following compound:

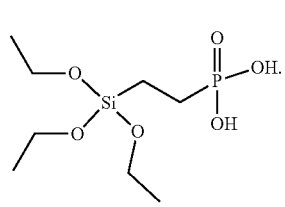

Compound 2

Optionally in Formula II, when n is 1, $R^1$, $R^2$, and $R^3$ are not simultaneously ethyl. In other words, in some examples, Formula II is not Compound 2.

As used herein, the term alkyl includes straight- and branched-chain monovalent substituents. Examples include methyl, ethyl, isobutyl, and the like. Ranges of these groups useful with the compounds and methods described herein include $C_1$-$C_{20}$ alkyl, $C_1$-$C_{12}$ alkyl, $C_1$-$C_8$ alkyl, $C_1$-$C_6$ alkyl, and $C_1$-$C_4$ alkyl.

The alkyl molecule used herein can be substituted or unsubstituted. As used herein, the term substituted includes the addition of a group (e.g., an alkoxy, aryloxy, amino, alkyl, alkenyl, alkynyl, aryl, heteroalkyl, heteroalkenyl, heteroalkynyl, heteroaryl, cycloalkyl, or heterocycloalkyl group) to a position attached to the main chain of the alkyl, e.g., the replacement of a hydrogen by one of these substituents. Examples of substituents include, but are not limited to, hydroxy, halogen (e.g., F, Br, Cl, or I), and carboxyl groups. Conversely, as used herein, the term unsubstituted indicates the alkyl has a full complement of hydrogens, i.e., commensurate with its saturation level, with no substitutions, e.g., linear decane (—$(CH_2)_9$—$CH_3$).

The coating compounds described herein can be prepared in a variety of ways. The compounds can be synthesized using various synthetic methods. At least some of these methods are known in the art of synthetic organic chemistry. The compounds described herein can be prepared from readily available starting materials. Optimum reaction conditions can vary with the particular reactants or solvent used, but such conditions can be determined by one skilled in the art by routine optimization procedures.

Variations on Formula I and Formula II include the addition, subtraction, or movement of the various constituents as described for each compound. Similarly, when one or more chiral centers are present in a molecule, all possible stereoisomers (enantiomers and diastereomers) are included. Additionally, compound synthesis can involve the protection and deprotection of various chemical groups. The use of protection and deprotection, and the selection of appropriate protecting groups, can be determined by one skilled in the art. The chemistry of protecting groups can be found, for example, in Wuts, Greene's Protective Groups in Organic Synthesis, 5th. Ed., Wiley & Sons, 2014, which is incorporated herein by reference in its entirety.

Reactions to produce the compounds described herein can be carried out in solvents, which can be selected by one of skill in the art. Solvents can be substantially nonreactive with the starting materials (reactants), the intermediates, or products under the conditions at which the reactions are carried out, i.e., temperature and pressure. Reactions can be carried out in one solvent or a mixture of more than one solvent. Product or intermediate formation can be monitored according to any suitable method known in the art. For example, product formation can be monitored by spectroscopic means, such as nuclear magnetic resonance spectroscopy (NMR) (e.g., $^1$H-NMR or $^{13}$C-NMR), infrared spectroscopy (IR), spectrophotometry (e.g., UV-visible), or mass spectrometry (MS), or by chromatography such as high performance liquid chromatography (HPLC) or thin layer chromatography (TLC).

Exemplary methods for synthesizing coating compounds as described herein are provided in Example 1 below.

The concentration of the coating compound in the coating composition can be from about 0.025 wt. % to about 6.6 wt. % (e.g., from about 0.05% to about 6.5%, from about 0.075% to about 6.4%, from about 0.1% to about 6.3%, from about 0.2% to about 6.2%, from about 0.3% to about 6.1%, from about 0.4% to about 6%, from about 0.5% to about 5.9%, from about 0.6% to about 5.8%, from about 0.7% to about 5.7%, from about 0.8% to about 5.6%, from about 0.9% to about 5.5%, from about 1% to about 5.4%, from about 1.1% to about 5.3%, from about 1.2% to about 5.2%, from about 1.3% to about 5.1%, from about 1.4% to about 5%, from about 1.5% to about 4.9%, from about 1.6% to about 4.8%, from about 1.7% to about 4.7%, from about 1.8% to about 4.6%, from about 1.9% to about 4.5%, from about 2% to about 4.4%, from about 2.1% to about 4.3%, from about 2.2% to about 4.2%, from about 2.3% to about 4.1%, from about 2.4% to about 4%, from about 2.5% to about 3.9%, from about 2.6% to about 3.8%, from about 2.7% to about 3.7%, from about 2.8% to about 3.6%, from about 2.9% to about 3.5%, from about 3% to about 3.4%, or from about 3.1% to about 3.3%). For example, the concentration of the coating compound in the coating composition can be about 0.025%, about 0.05%, about 0.075%, about 0.1%, about 0.125%, about 0.15%, about 0.175%, about 0.2%, about 0.225%, about 0.25%, about 0.275%, about 0.3%, about 0.325%, about 0.35%, about 0.375%, about 0.4%, about 0.425%, about 0.45%, about 0.475%, about 0.5%, about 0.525%, about 0.55%, about 0.575%, about 0.6%, about 0.625%, about 0.65%, about 0.675%, about 0.7%, about 0.725%, about 0.75%, about 0.775%, about 0.8%, about 0.825%, about 0.85%, about 0.875%, about 0.9%, about 0.925%, about 0.95%, about 0.975%, about 1%, about 1.025%, about 1.05%, about 1.075%, about 1.1%, about 1.125%, about 1.15%, about 1.175%, about 1.2%, about 1.225%, about 1.25%, about 1.275%, about 1.3%, about 1.325%, about 1.35%, about 1.375%, about 1.4%, about 1.425%, about 1.45%, about 1.475%, about 1.5%, about 1.525%, about 1.55%, about 1.575%, about 1.6%, about 1.625%, about 1.65%, about 1.675%, about 1.7%, about 1.725%, about 1.75%, about 1.775%, about 1.8%, about 1.825%, about 1.85%, about 1.875%, about 1.9%, about 1.925%, about 1.95%, about 1.975%, about 2%, about 2.025%, about 2.05%, about 2.075%, about 2.1%, about 2.125%, about 2.15%, about 2.175%, about 2.2%, about 2.225%, about 2.25%, about 2.275%, about 2.3%, about 2.325%, about 2.35%, about 2.375%, about 2.4%, about 2.425%, about 2.45%, about 2.475%, about 2.5%, about 2.525%, about 2.55%, about 2.575%, about 2.6%, about 2.625%, about 2.65%, about 2.675%, about 2.7%, about 2.725%, about 2.75%, about 2.775%, about 2.8%, about 2.825%, about 2.85%, about 2.875%, about 2.9%, about 2.925%, about 2.95%, about 2.975%, about 3%, about 3.025%, about 3.05%, about 3.075%, about 3.1%, about 3.125%, about 3.15%, about 3.175%, about 3.2%, about 3.225%, about 3.25%, about 3.275%, about 3.3%, about 3.325%, about 3.35%, about 3.375%, about 3.4%, about 3.425%, about 3.45%, about 3.475%, about 3.5%, about 3.525%, about 3.55%, about 3.575%, about 3.6%, about 3.625%, about 3.65%, about 3.675%, about 3.7%, about 3.725%, about 3.75%, about 3.775%, about 3.8%, about 3.825%, about 3.85%, about 3.875%, about 3.9%, about 3.925%, about 3.95%, about 3.975%, about 4%, about 4.025%, about 4.05%, about 4.075%, about 4.1%, about 4.125%, about 4.15%, about 4.175%, about 4.2%, about 4.225%, about 4.25%, about 4.275%, about 4.3%, about 4.325%, about 4.35%, about 4.375%, about 4.4%, about 4.425%, about 4.45%, about 4.475%, about 4.5%, about 4.525%, about 4.55%, about 4.575%, about 4.6%, about 4.625%, about 4.65%, about 4.675%, about 4.7%, about 4.725%, about 4.75%, about 4.775%, about 4.8%, about 4.825%, about 4.85%, about 4.875%, about 4.9%, about 4.925%, about 4.95%, about 4.975%, about 5%, about 5.025%, about 5.05%, about 5.075%, about 5.1%, about 5.125%, about 5.15%, about 5.175%, about 5.2%, about 5.225%, about 5.25%, about 5.275%, about 5.3%, about 5.325%, about 5.35%, about 5.375%, about 5.4%, about 5.425%, about 5.45%, about 5.475%, about 5.5%, about 5.525%, about 5.55%, about 5.575%, about 5.6%, about 5.625%, about 5.65%, about 5.675%, about 5.7%, about 5.725%, about 5.75%, about 5.775%, about 5.8%, about 5.825%, about 5.85%, about 5.875%, about 5.9%, about 5.925%, about 5.95%, about 5.975%, about 6%, about 6.025%, about 6.05%, about 6.075%, about 6.1%, about 6.125%, about 6.15%, about 6.175%, about 6.2%, about 6.225%, about 6.25%, about 6.275%, about 6.3%, about 6.325%, about 6.35%, about 6.375%, about 6.4%, about 6.425%, about 6.45%, about 6.475%, about 6.5%, about 6.525%, about 6.55%, about 6.575%, or about 6.6%.

In certain cases, the coating composition can include a wetting agent. As used herein, a wetting agent is a compound added to a composition (e.g., the coating composition described herein) that alters a surface energy of the coating composition such that the coating composition wets (e.g., spreads across) a surface of the substrate being coated. In some non-limiting examples, one or more wetting agents can be incorporated into the coating composition. Suitable wetting agents include, for example, Pluronic P123 (supplied by Merck, Darmstadt, Germany) and/or BYK (supplied by BYK Chemie GMBh, Wesel, Germany), can be used individually or in concert. In some examples, a total concentration of the wetting agent in the coating composition can be from about 0.001 wt. % to about 2.6 wt. % (e.g., from about 0.001% to about 2.5%, from about 0.01% to about 2.4%, from about 0.1% to about 2.3%, from about 0.2% to about 2.2%, from about 0.3% to about 2.1%, from about 0.4% to about 2%, from about 0.5% to about 1.9%, from about 0.6% to about 1.8%, from about 0.7% to about 1.7%, from about 0.8% to about 1.6%, from about 0.9% to about 1.5%, from about 1% to about 1.4%, or from about 1.1% to about 1.3%).

Methods of Preparing Coated Metal Substrates

The coating compositions described herein can be used for coating metal substrates. Suitable metal substrates for use in the disclosed methods include aluminum, aluminum alloys, titanium, titanium-based materials, copper, copper-based materials, steel, steel-based materials, bronze, bronze-based materials, brass, brass-based materials, composites, sheets used in composites, or any other suitable metal or combination of materials. The metal substrate may include monolithic materials as well as non-monolithic materials such as roll-bonded materials, clad materials, composite materials (such as but not limited to carbon fiber-containing materials), or various other materials. In some examples, the metal substrate is a metal coil, a metal strip, a metal plate, a metal sheet, a metal billet, a metal ingot, a metal extrusion, or the like.

In some non-limiting examples, the metal substrate includes an aluminum alloy. The aluminum alloy can include a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

Optionally, the aluminum alloy can be a 1xxx series aluminum alloy according to one of the following aluminum alloy designations: AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Optionally, the aluminum alloy can be a 2xxx series aluminum alloy according to one of the following aluminum alloy designations: AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Optionally, the aluminum alloy can be a 3xxx series aluminum alloy according to one of the following aluminum alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Optionally, the aluminum alloy can be a 4xxx series aluminum alloy according to one of the following aluminum alloy designations: AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Optionally, the aluminum alloy can be a 5xxx series aluminum alloy according to one of the following aluminum alloy designations: AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Optionally, the aluminum alloy can be a 6xxx series aluminum alloy according to one of the following aluminum alloy designations: AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Optionally, the aluminum alloy can be a 7xxx series aluminum alloy according to one of the following aluminum alloy designations: AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Optionally, the aluminum alloy can be an 8xxx series aluminum alloy according to one of the following aluminum alloy designations: AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

The coating composition as described herein can be applied to one or more surfaces of the metal substrate. The coating composition can be applied using any suitable coating application technique, including roller coating, spray coating, or immersion coating. The coating composition can be dried and/or cured to provide a coating layer adhered to the surface(s). Optionally, the coating layer has a thickness ranging from about 1 nm to about 50 nm (e.g., from about 2 nm to about 40 nm or from about 3 nm to about 30 nm). In some examples, the coating layer can have a thickness of about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, about 41 nm, about 42 nm, about 43 nm, about 44 nm, about 45 nm, about 46 nm, about 47 nm, about 48 nm, about 49 nm, or about 50 nm.

Methods of Use

The described methods can be advantageously employed in, among others, the transportation and motor vehicle industries, including, but not limited to, automotive manufacturing, truck manufacturing, manufacturing of ships and boats, manufacturing of trains, airplanes and spacecraft manufacturing. Some non-limiting examples of the motor vehicle parts include floor panels, rear walls, rockers, motor hoods, fenders, roofs, door panels, B-pillars, longerons, body sides, rockers or crash members. The term "motor vehicle" and the related terms as used herein are not limited to automobiles and include various vehicle classes, such as, automobiles, cars, buses, motorcycles, marine vehicles, off highway vehicles, light trucks, trucks, or lorries.

In certain aspects, the products and methods can be used to prepare aerospace vehicle body part products. For example, the disclosed products and methods can be used to prepare airplane body parts, such as skin alloys. The products and methods can be used in any other desired application.

In addition, the described products and methods can be advantageously employed in manufacturing of various parts of mechanical and other devices or machinery, including weapons, tools, bodies of electronic devices, and other parts and devices. Optionally, the products and methods described herein can be used in electronics applications (e.g., as an electronics device housing), in architectural applications (e.g., as an architectural structural part or an architectural aesthetic part), or in consumer product applications (e.g., as a consumer product container, such as a can or bottle).

In some examples, the metal substrate is a shaped metal product formed from any metal product described herein and including a coating layer as described herein. Optionally, the shaped metal product can be joined to another product prepared from a similar metal or a different metal (e.g., a second metal substrate). The second metal substrate can be attached to a surface of the coated metal substrate to which the coating layer is adhered. In some non-limiting examples, the shaped metal product (e.g., a shaped aluminum alloy product) and the second metal substrate are bonded to form a joint of any suitable configuration, including lap, edge, butt, T-butt, hem, T-edge, and the like. In some non-limiting examples, bonding can be performed employing an adhesive to bond two metal products together. Bond durability, as used herein, refers to the bond strength after exposure to harsh conditions (e.g., a neutral salt spray test, or an aqueous salt solution immersion test) and subsequent tensile testing (e.g., to evaluate strength of the bond after exposure to harsh conditions).

ILLUSTRATIONS

Illustration 1 is a compound of Formula I:

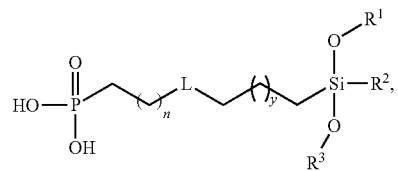

wherein:
wherein n and y are each independently an integer from 1 to 10; L is —S—, —SO$_2$—, —O—, —NR—, or —N—(CH$_2$)$_p$—OP(OH)$_2$—, wherein R is H or substituted or unsubstituted alkyl and p is from 1 to 10; $R^1$ and $R^3$ are each independently selected from H and substituted or unsubstituted alkyl; and $R^2$ is selected from $OR^4$, substituted or unsubstituted alkyl, and substituted or unsubstituted phenyl, wherein $R^4$ is H or substituted or unsubstituted alkyl.

Illustration 2 is the compound of any preceding or subsequent illustration, wherein n and y are each 1.

Illustration 3 is the compound of any preceding or subsequent illustration, wherein L is —NH—.

Illustration 4 is the compound of any preceding or subsequent illustration, wherein $R^1$ and $R^3$ are each H and $R^2$ is OH.

Illustration 5 is the compound of any preceding or subsequent illustration, wherein the compound is

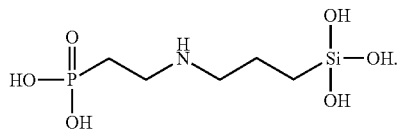

Illustration 6 is a compound of Formula II:

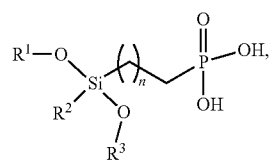

wherein:
n is an integer from 0 to 10; $R^1$ and $R^3$ are each independently selected from H and substituted or unsubstituted alkyl; and $R^2$ is selected from $OR^4$, substituted or unsubstituted alkyl, and substituted or unsubstituted phenyl, wherein $R^4$ is selected from H and substituted or unsubstituted alkyl, wherein when n is 1, $R^1$, $R^2$, and $R^3$ are not simultaneously ethyl.

Illustration 7 is a method of coating a metal substrate surface, comprising applying to a metal substrate surface a compound of Formula I:

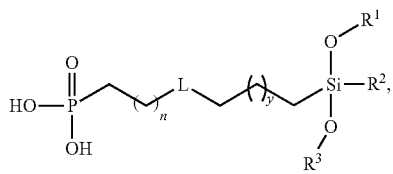

wherein:
  wherein n and y are each independently an integer from 1 to 10; L is —S—, —SO$_2$—, —O—, —NR—, or —N—(CH$_2$)$_p$—OP(OH)$_2$—, wherein R is H or substituted or unsubstituted alkyl and p is from 1 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is H or substituted or unsubstituted alkyl.

Illustration 8 is the method of any preceding or subsequent illustration, wherein n and y are each 1.

Illustration 9 is the method of any preceding or subsequent illustration, wherein L is —NH.

Illustration 10 is the method of any preceding or subsequent illustration, wherein R$^1$ and R$^3$ are each H and R$^2$ is OH.

Illustration 11 is the method of any preceding or subsequent illustration, wherein the compound is

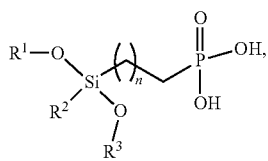

Illustration 12 is a method of coating a metal substrate surface, comprising applying to a metal substrate surface a composition comprising a compound of Formula II:

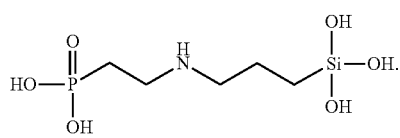

wherein:
  n is an integer from 0 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is selected from H and substituted or unsubstituted alkyl.

Illustration 13 is the method of any preceding or subsequent illustration, wherein n is 1.

Illustration 14 is the method of any preceding or subsequent illustration, wherein R$^1$, R$^2$, and R$^3$ are each substituted or unsubstituted alkyl.

Illustration 15 is the method of any preceding or subsequent illustration, wherein R$^1$, R$^2$, and R$^3$ are each ethyl.

Illustration 16 is the method of any preceding or subsequent illustration, wherein the compound is:

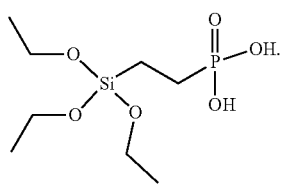 [SMILES: CCO[Si](CCP(=O)(O)O)(OCC)OCC]

Illustration 17 is the method of any preceding or subsequent illustration, wherein the applying is performed by roller coating, spray coating, or dip coating.

Illustration 18 is the method of any preceding or subsequent illustration, further comprising curing the coating composition to provide a coated metal substrate.

Illustration 19 is a coated metal substrate, comprising a metal substrate comprising at least a first surface; and a coating layer adhered to the first surface, wherein the coating layer comprises a compound of Formula I:

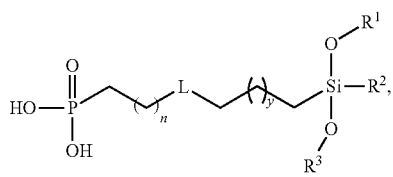

wherein:
  wherein n and y are each independently an integer from 1 to 10; L is —S—, —SO$_2$—, —O—, —NR—, or —N—(CH$_2$)$_p$—OP(OH)$_2$—, wherein R is H or substituted or unsubstituted alkyl and p is from 1 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is H or substituted or unsubstituted alkyl.

Illustration 20 is a coated metal substrate, comprising a metal substrate comprising at least a first surface; and a coating layer adhered to the first surface, wherein the coating layer comprises a compound of Formula II:

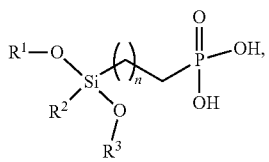

wherein:
  n is an integer from 0 to 10; R$^1$ and R$^3$ are each independently selected from H and substituted or unsubstituted alkyl; and R$^2$ is selected from OR$^4$, substituted or unsubstituted alkyl, and substituted or unsubstituted phenyl, wherein R$^4$ is selected from H and substituted or unsubstituted alkyl.

Illustration 21 is the coated metal substrate of any preceding or subsequent illustration, wherein the metal substrate comprises an aluminum alloy substrate.

Illustration 22 is the coated metal substrate of any preceding or subsequent illustration, wherein the aluminum alloy substrate comprises a 1xxx series aluminum alloy, a 2xxx series aluminum alloy, a 3xxx series aluminum alloy, a 4xxx series aluminum alloy, a 5xxx series aluminum alloy, a 6xxx series aluminum alloy, a 7xxx series aluminum alloy, or an 8xxx series aluminum alloy.

Illustration 23 is a joined metal structure, comprising the coated metal substrate of any preceding or subsequent illustration and a second metal substrate attached to the coated metal substrate.

Illustration 24 is the joined metal structure of any preceding or subsequent illustration, wherein the second metal substrate is attached to the first surface of the coated metal substrate.

Illustration 25 is the joined metal structure of any preceding illustration, wherein the joined metal structure is a transportation structural part, a transportation aesthetic part, an electronics device housing, an architectural structural part, an architectural aesthetic part, a consumer product container, or a consumer product.

The following examples will serve to further illustrate the present invention without, at the same time, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1

Synthesis of Compounds 1 and 2

Compound 1 was prepared according to the method shown in Schemes 1 and 2 below.

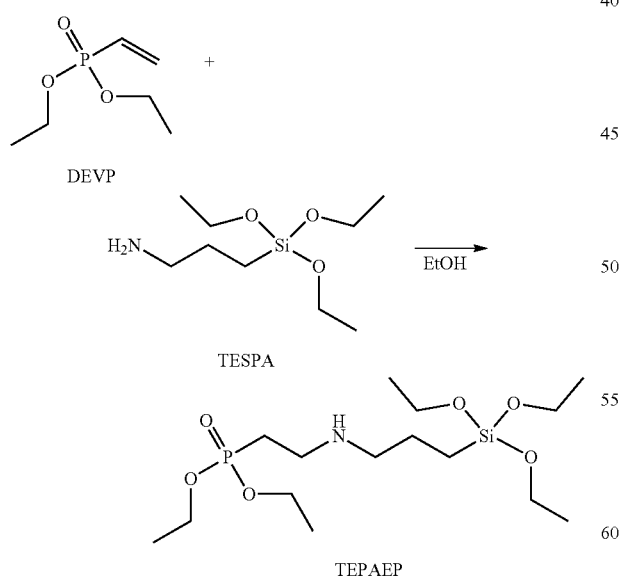

Diethyl vinylphosphonate (1.20 eq.; DEVP) was added to ethanol (EtOH) in a three-neck round bottomed flask. Aminopropyl triethoxysilane (1 eq.; TESPA) was added slowly to the mixture. The reaction was then heated up to 85° C. for 24 hours. The mixture was then cooled to room temperature and the EtOH was evaporated until the concentration of diethyl (2-((3-(triethoxysilyl)propyl)amino)ethyl)phosphonate (TEPAEP) in solution reached 30-50% wt/v. The reaction mixture of TEPAEP in ethanol and its purity were analyzed with $^1$H, $^{13}$C, and $^{31}$P NMR.

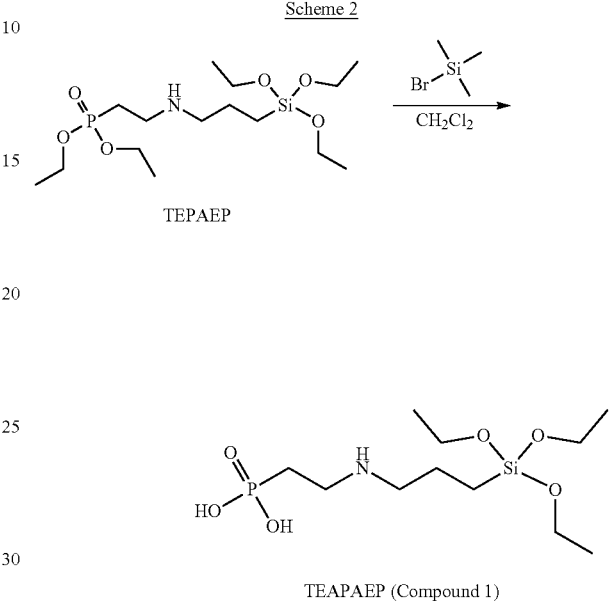

The previously synthesized TEPAEP was used as stored (30-50% molecules in EtOH). A three-neck round-bottom flask was charged with diethyl (2-((3-(triethoxysilyl)propyl)amino)ethyl)phosphonate (1 eq.) (30-50% wt./v in EtOH) and anhydrous dichloromethane (DCM) (24 eq.) under an inert atmosphere. Trimethylbromosilane (3.19 eq.) was added dropwise at room temperature. After complete addition, the reaction solution was refluxed for 24 hours. Dry EtOH (10 eq.) was then added under an inert atmosphere and the reaction solution was allowed to stir at room temperature overnight. The solution was then concentrated under vacuum and lost solvent was replaced with dry EtOH, maintaining a final concentration of product of 30-50% wt./v. The purity of TEAPAEP (compound 1) was confirmed using $^1$H, $^{13}$C, and $^{31}$P NMR.

Compound 2 was prepared according to the method shown in Scheme 3 below.

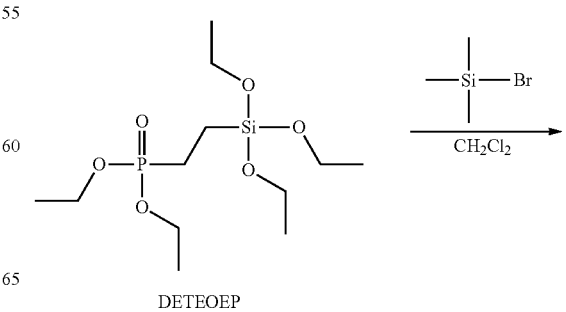

-continued

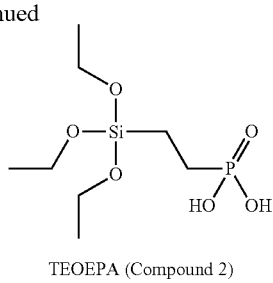

TEOEPA (Compound 2)

Compound 2 ((2-(triethoxysilyl)ethyl)phosphonic acid; TEOEPA) was obtained by reacting diethyl (2-(triethoxysilyl)ethyl)phosphonate (1 eq.; DETEOEP) and trimethylbromosilane (3.19 eq.). Trimethylbromosilane was added dropwise to DETEOEP in $CH_2Cl_2$ in a three-neck round bottomed flask. The mixture was then heated to reflux for three hours. After cooling to room temperature, the solvent was evaporated and replaced by EtOH until the concentration was 30-50% wt./v in EtOH. The final product (Compound 2) and its purity were analyzed via $^1H$, $^{13}C$, and $^{31}P$ NMR.

Example 2

Bond Durability

FIG. 1 is a graph showing bond durability results of a 5xxx-series aluminum alloy (e.g., AA5754) and a 6xxx-series aluminum alloy (e.g., 6111) prepared according to methods described herein. The aluminum alloys were cut into testing coupons, cleaned via an acid-etch procedure, and optionally coated with a coating composition as described herein. Each alloy employed a control sample (referred to as "Etch only"), a sample to which a coating compositions layer of Compound 1 was added, and a sample to which a coating composition layer of Compound 2 was added. Similarly pretreated test coupons were then bonded together with a commercially available adhesive formulation BM4601 (supplied by Dow Automotive Systems, Wilmington, DE) and coated with a lubricant formulation DC-290 (supplied by Quaker Chemical B.V.; Uithoorn, The Netherlands). Bonded test coupons were then subjected to a bond durability test wherein bonded test coupons were subjected to a tension of 2400 N while undergoing cyclic exposure to immersion in an aqueous salt solution followed by exposure to a high humidity (e.g., at least about 75% relative humidity (RH)) and high temperature (e.g., at least about 30° C.) atmosphere. Samples completing at least 20 cycles on the bond durability test were considered as passing.

As evident in FIG. 1, the samples treated with Compound 1 and Compound 2 passed the bond durability test for both the 5xxx series aluminum alloy and the 6xxx series aluminum alloy. Compound 2 provided a significant increase in bond durability in the 5xxx series aluminum alloy. The coating compositions described herein were shown to improve bond durability in both the 5xxx series aluminum alloy and the 6xxx series aluminum alloy when compared to the control sample (i.e., a non-pretreated aluminum alloy sample cleaned via an acid etch procedure).

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptions thereof will be readily apparent to those skilled in the art without departing from the spirit and scope of the present invention as defined in the following claims.

What is claimed is:

1. A compound of Formula I:

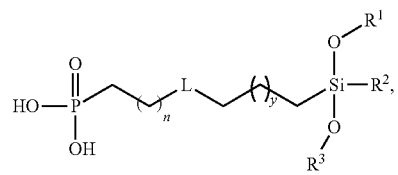

wherein:
n and y are each independently an integer from 1 to 10;
L is —S—, —SO$_2$—, —O—, —NR—, or —N—(CH$_2$)$_p$—OP(OH)$_2$—, wherein R is H or substituted or unsubstituted alkyl and p is from 1 to 10;
$R^1$ and $R^3$ are each independently selected from H and substituted or unsubstituted alkyl; and
$R^2$ is selected from $OR^4$, substituted or unsubstituted alkyl, and substituted or unsubstituted phenyl, wherein $R^4$ is selected from H and substituted or unsubstituted alkyl.

2. The compound of claim 1, wherein n and y are each 1.
3. The compound of claim 1, wherein L is —NH.
4. The compound of claim 1, wherein $R^1$ and $R^3$ are each H and $R^2$ is OH.
5. The compound of claim 1, wherein the compound is

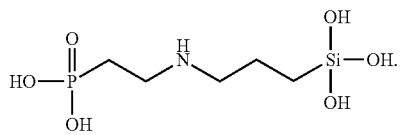 [SMILES: O=P(O)(O)CCNCCC[Si](O)(O)O]

6. A method of coating a metal substrate surface, comprising applying to a metal substrate surface a coating composition comprising the compound of claim 1.
7. The method of claim 6, wherein n and y are each 1.
8. The method of claim 6, wherein L is —NH.
9. The method of claim 6, wherein $R^1$ and $R^3$ are each H and $R^2$ is OH.
10. The method of claim 6, wherein the compound is

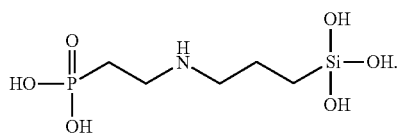 [SMILES: O=P(O)(O)CCNCCC[Si](O)(O)O]

11. The method of claim 6, wherein the applying is performed by roller coating, spray coating, or dip coating.
12. The method of claim 6, further comprising curing the coating composition to provide a coated metal substrate.
13. A coated metal substrate, comprising:
a metal substrate comprising at least a first surface; and
a coating layer adhered to the first surface, wherein the coating layer comprises the compound of claim 1.

* * * * *

UNITED STATES PATENT AND TRADEMARK OFFICE
CERTIFICATE OF CORRECTION

| | | |
|---|---|---|
| PATENT NO. | : 11,827,807 B2 | Page 1 of 1 |
| APPLICATION NO. | : 17/753538 | |
| DATED | : November 28, 2023 | |
| INVENTOR(S) | : Corrado Bassi et al. | |

It is certified that error appears in the above-identified patent and that said Letters Patent is hereby corrected as shown below:

On the Title Page

Item (73) Assignee, add -- EMPA, Swiss Federal Laboratories for Materials Science and Technology, Dübendorf, Switzerland --

Signed and Sealed this
Fourth Day of June, 2024

Katherine Kelly Vidal
*Director of the United States Patent and Trademark Office*